(12) United States Patent
Ishikawa et al.

(10) Patent No.: US 7,038,851 B2
(45) Date of Patent: May 2, 2006

(54) IMAGE DISPLAY DEVICE AND INFORMATION RECORDING MEDIUM

(75) Inventors: Masaru Ishikawa, Saitama (JP); Hiroshi Toriumi, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/423,899

(22) Filed: Apr. 28, 2003

(65) Prior Publication Data

US 2003/0214577 A1 Nov. 20, 2003

(30) Foreign Application Priority Data

May 8, 2002 (JP) .......................... P. 2002-133214

(51) Int. Cl.
*G02B 27/22* (2006.01)
(52) U.S. Cl. ...................... 359/463; 359/462; 359/455; 359/458
(58) Field of Classification Search ........ 359/462–464, 359/454, 455, 458
See application file for complete search history.

(56) References Cited

U.S. PATENT DOCUMENTS

| 4,671,625 | A | | 6/1987 | Noble | |
| 6,014,259 | A | | 1/2000 | Wohlstadter | |
| 6,614,552 | B1 | * | 9/2003 | Davies et al. | .............. 358/1.18 |
| 6,650,396 | B1 | * | 11/2003 | Li | ............................... 352/58 |

FOREIGN PATENT DOCUMENTS

| JP | 10-221644 A | 8/1988 |
| JP | 6-208081 A | 7/1994 |
| WO | WO 95/34018 | 12/1995 |
| WO | WO 00/22474 A | 4/2000 |

OTHER PUBLICATIONS

Snyder, J.J. et al.; "Fast Diffraction—Limited Cylindrical Microlenses", Applied Optics, Optical Society of America, Washington, US, vol. 30, No. 19, Jul. 1, 1991. pp. 2743-2747, XP000216350.

* cited by examiner

*Primary Examiner*—Drew A. Dunn
*Assistant Examiner*—Joshua L. Pritchett
(74) *Attorney, Agent, or Firm*—Sughrue Mion, PLLC

(57) ABSTRACT

An image display device includes a display portion, an image transmission panel, a stereo frame and a video signal supply portion. The display portion has an image display surface for displaying an image inclusive of a stereo image. The image transmission panel is disposed in a space on a side opposite to the display portion so as to be separated from and parallel to the image display surface. The image transmission panel forms the image displayed on the image display surface. The stereo frame is disposed on a part of an image-forming plane where the image is formed. The video signal supply portion supplies a video signal to the display portion so that the stereo image formed on the image-forming plane moves between an inside space of the stereo frame and an outside space of the stereo frame.

9 Claims, 4 Drawing Sheets

IMAGE DISPLAY DEVICE AND INFORMATION RECORDING MEDIUM

The present disclosure relates to the subject matter contained in Japanese Patent Application No. 2002-133214 filed May 8, 2002, which is incorporated herein by reference in its entirety.

BACKGROUND OF THE INVENTION

1. Field of the Invention

The present invention relates to an image display device and an information recording medium.

2. Background Art

As a method for reproducing a stereo image, there is a polarizing method in which left and right parallactic images based on different states of polarization are viewed by a viewer with polarizing spectacles on. This method has a disadvantage that putting such polarizing spectacles on is a nuisance to the viewer. As a stereo image display device without use of polarizing spectacles, there is known a device of the type in which striped images arranged alternately on the basis of left and right parallactic images, that is, parallactic images corresponding to viewer's two eyes are supplied to the viewer's two eyes by lenticular lenses to be recognized as a stereo image by the viewer. This type device has a disadvantage that resolution is lowered to a half when the stereo image is displayed.

Therefore, a stereo image display device in which a polarizing unit constituted by two kinds of polarizing plates having axes of polarization perpendicular to each other and properly arranged alternately in a predetermined direction at intervals of a predetermined pitch is used in order to prevent unnecessary reflected light from the display surface or reduce moire, color shift, or the like, when a stereo image is viewed by use of lenticular lenses has been disclosed, for example, in JP-A-10-221644.

In any conventional stereo image display device, however, parallactic images corresponding to the viewer's two eyes need to be prepared when the stereo image is photographed. Accordingly, much design is required for supplying the parallactic images.

SUMMARY OF THE INVENTION

In order to solve the problems, an object of the invention is to provide an image display device which can display a stereo image with a simple configuration and by which pleasure and impression can be given to a viewer.

To achieve the object, the invention provides an image display device, a display portion having an image display surface for displaying an image inclusive of a stereo image; an image transmission panel disposed so as to be separated from and parallel to the image display surface and for forming the image displayed on the image display surface, in a space on a side opposite to the display portion; a stereo frame disposed on a part of an image-forming plane where the image is formed; and a video signal supply portion for supplying a video signal to the display portion so that the stereo image formed on the image-forming plane moves between an inside space of the stereo frame and an outside space of the stereo frame.

The invention further provides an information recording medium in an image display device, wherein the image display device includes a display portion having an image display surface for displaying an image inclusive of a stereo image, an image transmission panel disposed so as to be separated from and parallel to the image display surface and for forming the image displayed on the image display surface, in a space on a side opposite to the display portion, a stereo frame disposed on a part of an image-forming plane where the image is formed, and a video signal supply portion for playing back the information recording medium and supplying a playback video signal to the display portion; and wherein the information recording medium records thereon the video signal so that the stereo image formed on the image-forming plane moves between an inside space of the stereo frame and an outside space of the stereo frame.

The invention further provides an image reproducing method, including: disposing a stereo frame on a part of an image-forming plane, the image-forming plane being a focusing surface of an image transmission portion; reproducing a predetermined video signal to display an image on a display; and focusing the image on the image-forming plane through the image transmission portion to form a stereo image on the image-forming plane. The stereo image moves between an inside space of the stereo frame and an outside space of the stereo frame.

BRIEF DESCRIPTION OF THE DRAWINGS

The present invention may be more readily described with reference to the accompanying drawings, in which.

DETAILED DESCRIPTION OF THE PREFERRED EMBODIMENTS

Figure 1:
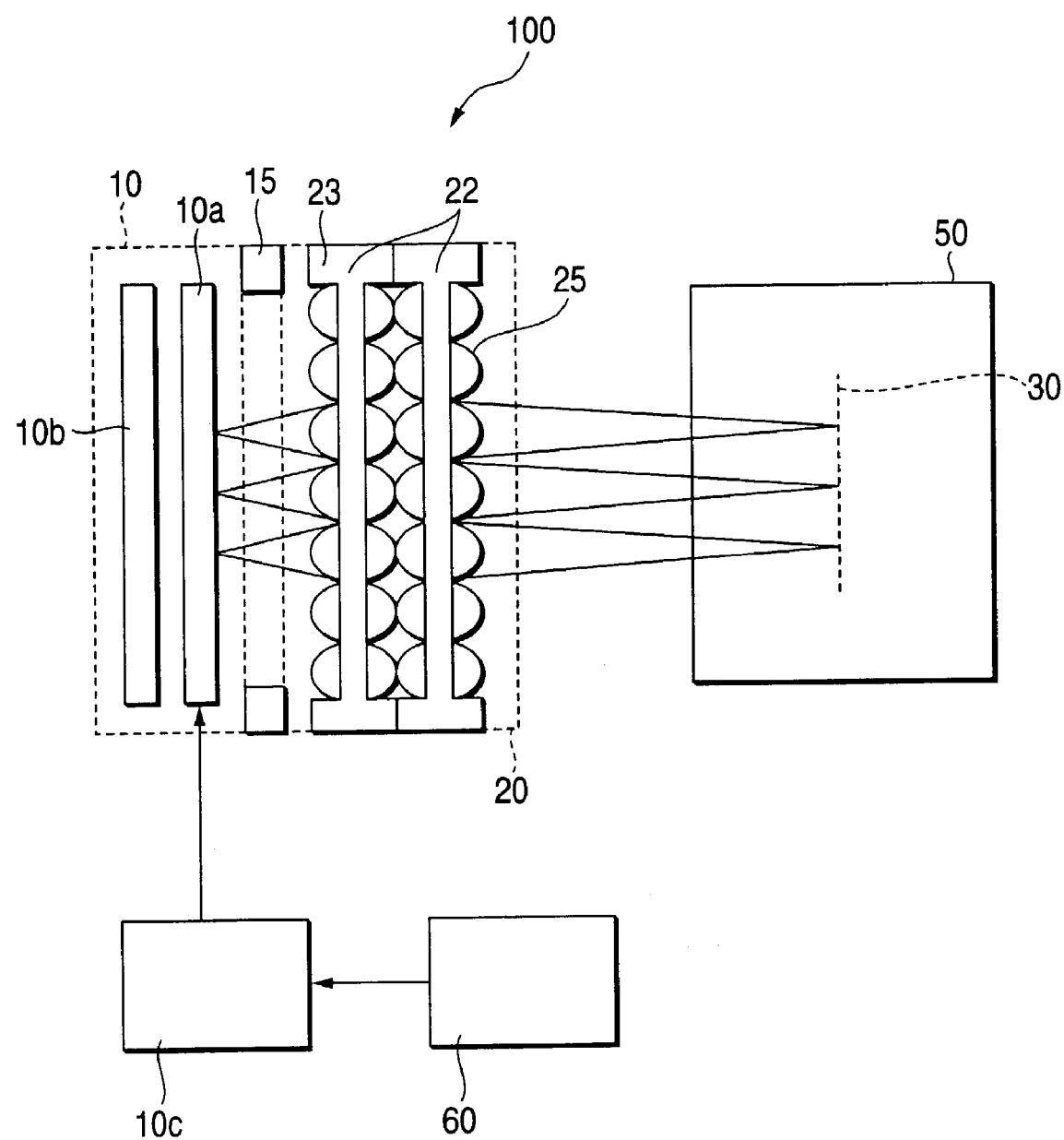
FIG. 1 is a schematic sectional view of a stereo image display device according to an embodiment of the invention.

An embodiment of an image display device according to the invention will be described below with reference to the drawings. FIG. 1 is a schematic sectional view showing an image display device 100. The image display device 100 includes a display portion 10, an image transmission panel 20 supported by a support member 15, a stereo frame 50 disposed on a plane 30 of an image formed by the image transmission panel 20, and a video signal supply portion 60 for supplying a video signal to the display portion 10. The image transmission panel 20 forms an image displayed on the display portion 10, in a space located on a side (right side in FIG. 1) opposite to the display portion 10 to thereby produce the image-forming plane 30. The stereo frame 50 is made of a transparent material such as acrylic resin or glass and shaped like a cylinder. The stereo frame 50 can be replaced by a glass cup, a beaker, or the like (see FIG. 3). Incidentally, the stereo frame 50 maybe colored with a semitransparent color such as light blue or a top or bottom surface of the stereo frame 50 may be closed. The shape of the stereo frame 50 is not limited to the cylindrical shape.

The display portion 10 has a color liquid crystal panel 10a, a backlight illumination portion 10b, and a color liquid crystal drive circuit 10c. The color liquid crystal panel 10a has a flat image display surface for displaying an image inclusive of a stereo image. Incidentally, for example, a cathode-ray tube, a plasma display or an organic electroluminescent display may be used as the display portion 10. The color liquid crystal drive circuit 10c is connected to the video signal supply portion 60 which supplies a video signal to be displayed on the liquid crystal panel 10a.

The image transmission panel 20 is made of a pair of micro lens arrays 22. Each of the micro lens arrays 22 has a lens frame 23 in which an effective lens region of the micro lens array 22 is enclosed. The lens frames 23 are supported by a support member 15. The image transmission pane 120 is disposed so as to be separated from and parallel to the image display surface of the color liquid crystal panel 10a. The micro lens arrays 22 constitute an erecting isometric optical system for visualizing a two-dimensional image inclusive of a stereo image displayed on the image display surface of the color liquid crystal panel 10a. The micro lens arrays 22 have an effective lens area with which the image display surface is substantially covered. The lens frames 23 exhibit a dark color such as black and are formed so that viewer's awareness of the presence of the micro lens arrays 22 can be suppressed in some degree.

Figure 2:
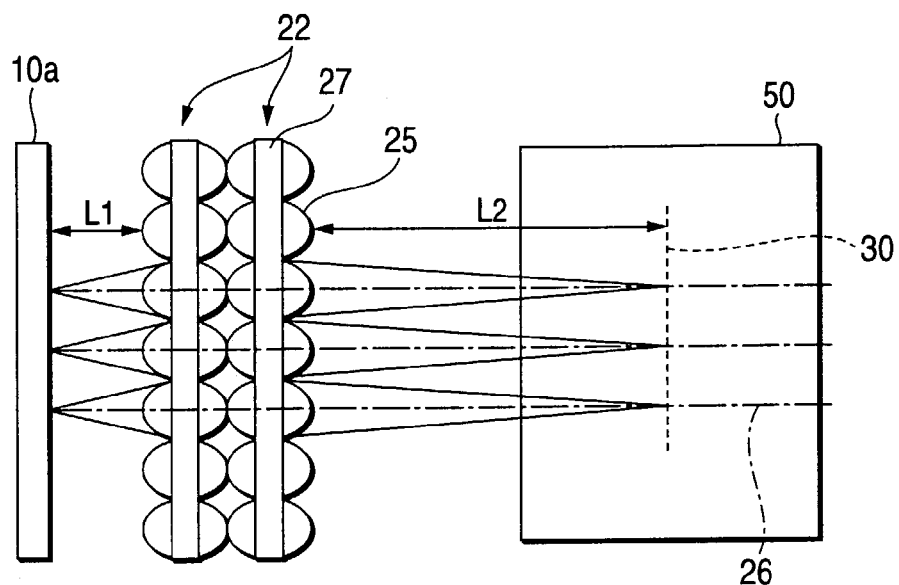
FIG. 2 is a partly sectional view of micro lens arrays in this embodiment.

A plurality of micro convex lenses 25 arranged in the form of a matrix so as to be adjacent to one another are provided on each of opposite surfaces of each micro lens array 22. As shown in FIG. 2, the micro lens arrays 22 are arranged so closely that optical axes 26 of corresponding ones of the convex lenses 25 are coaxial with each other. The convex lenses 25 formed on the right surface of the right micro lens array 22 in FIG. 2 are provided to be larger in curvature than the convex lenses formed on the other surfaces. The distance L2 (approximately equal to the focal length) between the plane 30 of an image formed by the right micro lens array 22 in FIG. 2 and a lens surface thereof is set to be larger than the distance L1 (approximately equal to the focal length) between the plane (on a surface of the liquid crystal panel 10a) of an image formed by the left micro lens array 22 in FIG. 2 and a lens surface thereof. Accordingly, the image-forming plane 30 is separated sufficiently from the image transmission panel 20 so that the image can be made to look more stereoscopic while the depth of the image display device can be made compact.

Figure 4:
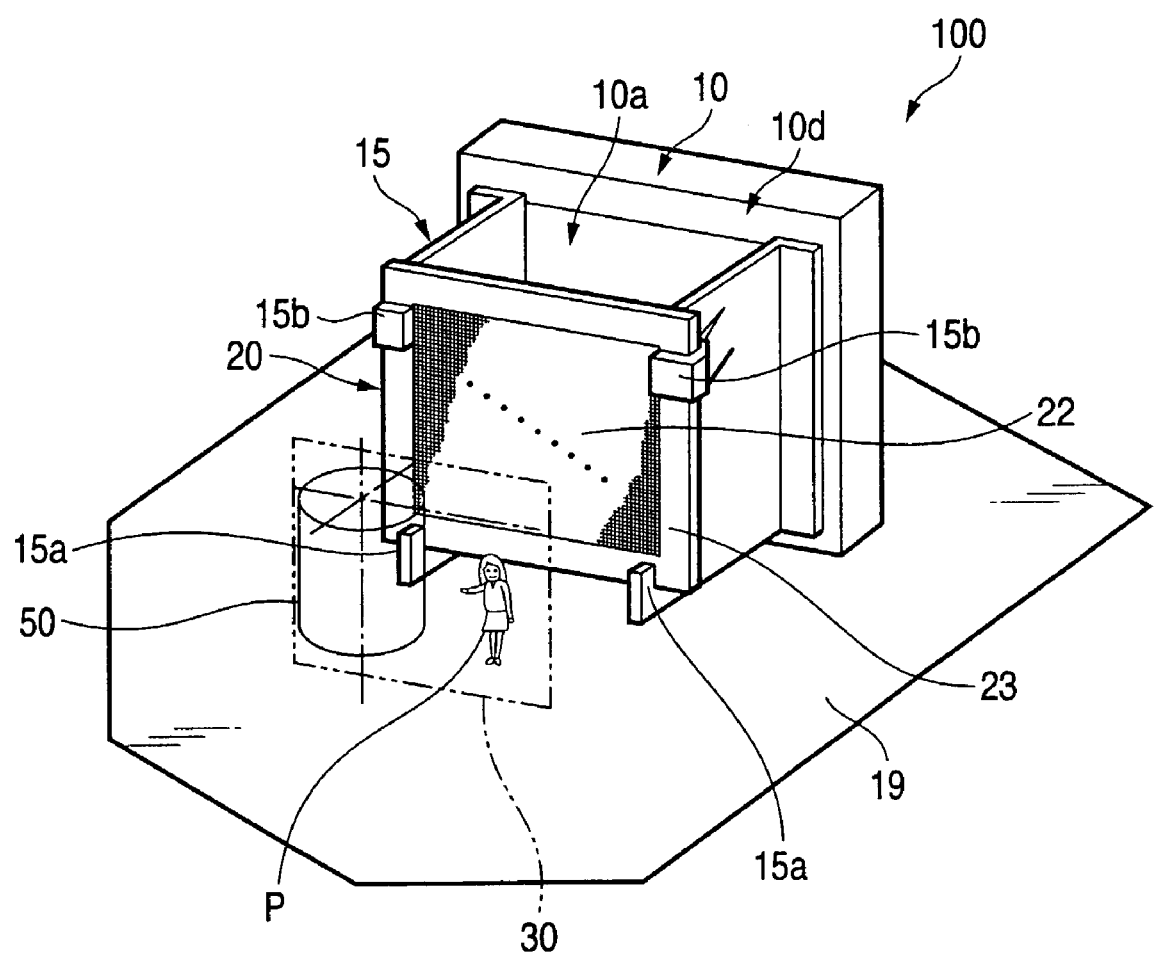
FIG. 4 is a schematic perspective view showing another display state of the stereo image display device according to this embodiment.
Figure 5:
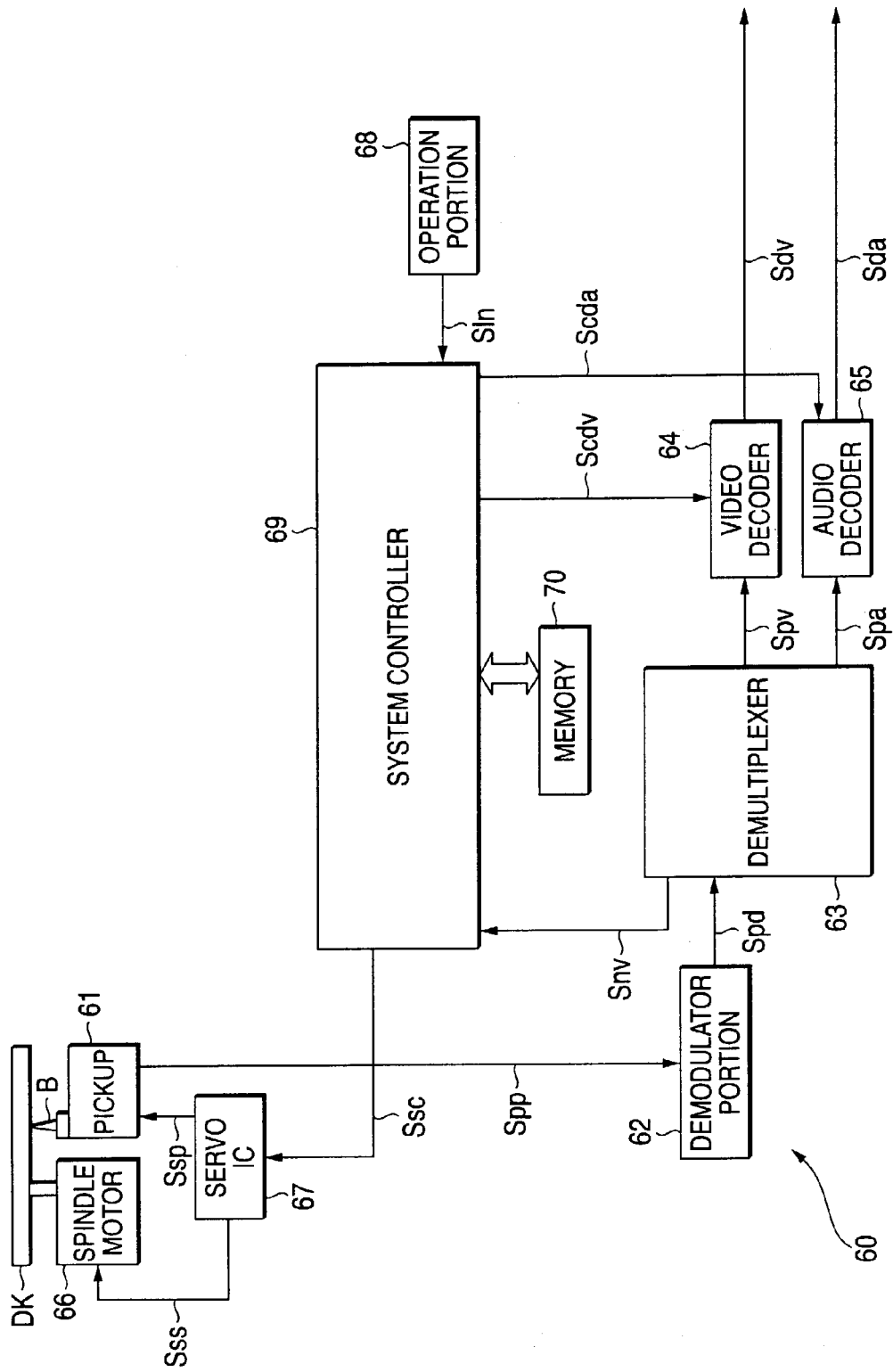
FIG. 5 is a block diagram showing the schematic configuration of a video signal supply portion 60 in this embodiment.

FIG. 5 is a block diagram showing the schematic configuration of the video signal supply portion 60. The video signal supply portion 60 constitutes a recording medium playback system which plays back a recording medium DK having a recorded video signal and supplies the video signal to the display portion 10. The video signal recorded in the recording medium DK in advance has such a motion image that the stereo image P formed on the image-forming plane 30 moves between a state (see FIG. 3) in which the stereo image P is located in an inside space of the stereo frame 50 and a state (see FIG. 4) in which the stereo image P is located in an outside space of the stereo frame 50. Moreover, the video signal is generated in advance so that the size of the stereo image P can be contained in the inside space of the stereo frame 50. In addition, the background portion except the stereo image is colored with a dark color such as silver or black so that the stereo image P viewed stands out stereoscopically against the background portion. Incidentally, when the video signal is generated so that the stereo image P becomes small as it moves to the inside space of the stereo frame 50, greater pleasure and impression can be given to a viewer.

On the other hand, the video signal supply portion 60 has a pickup 61 for reading recording pits on the recording medium by irradiating the recording medium DK with a light beam, a demodulator portion 62 for demodulating a signal Spp regenerated by the pickup 61 and outputting a demodulated signal Spd, a demultiplexer 63 for separating the demodulated signal Spd into a video information signal Spv and an audio information signal Spa and outputting the video information signal Spv and the audio information signal Spa, a video decoder 64 for decoding the video information signal Spv and outputting a video signal Sdv, an audio decoder 65 for decoding the audio information signal Spa and outputting an audio signal Sda, a spindle motor 66 for driving the recording medium DK to rotate, a servo circuit 67 for performing rotating control of the spindle motor 66 and focusing servo control and tracking servo control of the pickup 61, an operation portion 68 operated by a user, a system controller 69 for controlling the system as a whole on the basis of an operation signal Sin given from the operation portion 68, and a memory 70.

Figure 3:
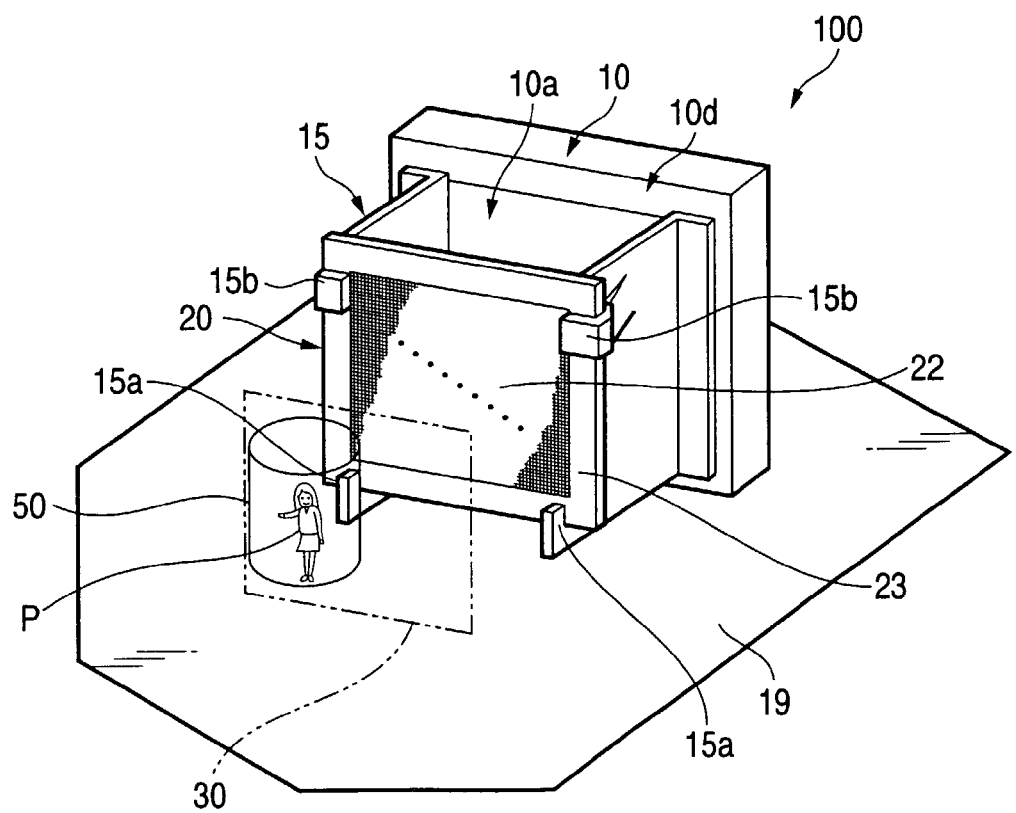
FIG. 3 is a schematic perspective view showing a display state of the stereo image display device according to this embodiment.

A procedure for mounting the image transmission panel 20 will be described below. As shown in FIG. 3, the display portion 10 formed so that a circumference 10d of the liquid crystal panel 10a for displaying a two-dimensional image inclusive of a stereo image is colored with black is fixed on a stage 19 exhibiting a dark color such as black. Support plates which are support members 15 are fixed to the circumference of the liquid crystal panel 10a of the display portion 10 so that the support members are arranged vertically to block horizontal visibility. At least the liquid crystal panel 10a side inner portions of the support members 15 are colored with black. Carrier portions 15a are provided at lower ends of free edge portions of the support plates. Spring portions 15b opposite to each other are provided in upper portions of the free edge portions of the support plates so that elastic force can be provided in a horizontal direction.

While the lens frames 23 of the image transmission panel 20 are inserted so as to be clamped between the spring portions 15b, the image transmission panel 20 is placed on the carrier portions 15a and arranged so as to be separated from and parallel to the image display surface of the display portion 10. Because the lens frames 23 exhibit black, the support members 15 can be hidden from the viewing side. The image transmission panel 20 and the image display surface of the display portion 10 are arranged in advance to have such relation of relative position that the image display surface is made coincident with a focal plane of the micro lens array 22 disposed on the image display surface side. In this positional relation, when a stereo image is displayed on the image display surface of the display portion 10, the stereo image is also formed on the image-forming plane 30. As a result, the stereo image can be viewed as an image which floats up in the air.

An operation of the image display device 100 according to this embodiment will be described below.

When the operation portion 133 is operated to given an instruction to play back the recording medium DK, the video signal supply portion 60 starts to reproduce a video signal recorded in the recording medium DK. The pickup 61 applies a playback light beam B of predetermined intensity onto an information track (not shown) of the recording medium DK, generates a playback signal Spp corresponding to the video signal recorded in the information track on the basis of the reflected light and supplies the playback signal Spp to the demodulator portion 62. The demodulator portion 62 demodulates the playback signal Spp and supplies a demodulated signal Spd to the demultiplexer 63. The demultiplexer 63 separates the demodulated signal Spd into a video information signal Spv and an audio information signal Spa and supplies the video information signal Spv and the audio information signal Spa to the video decoder 64 and the audio decoder 65 respectively. The video decoder 64 applies decoding corresponding to coding of a video signal such as MPEG2 to the video information signal Spv and supplies a video signal Sdv to the liquid crystal drive circuit 10c of the display portion 10. On the other hand, the audio decoder 65 decodes the audio information signal Spa and supplies an audio signal Sda to an amplifier not shown but provided in the outside of the device.

Upon reception of the video signal, the display portion 10 displays a motion image inclusive of a stereo image on its display screen. The stereo image displayed on the display screen is formed on the image-forming plane 30 by the image transmission panel 20. As described above, a video signal recorded in the recording medium DK in advance has such a motion image that the stereo image P formed on the image-forming plane 30 moves between a state in which the stereo image P is located in the inside space of the stereo frame 50 and a state in which the stereo image P is located in the outside space of the stereo frame 50. Accordingly, the stereo image P formed on the image-forming plane 30 moves so that the stereo image P jumps out from a state (FIG. 3) in which the stereo image P is contained in the inside space of the stereo frame 50 to a state (FIG. 4) in which the stereo image P is located in the outside space of the stereo frame 50, or the stereo image P conversely jumps into a state (FIG. 3) in which the stereo image P is contained in the inside space of the stereo frame 50 from a state (FIG. 4) in which the stereo image P is located in the outside space of the stereo frame 50. Incidentally, when the video signal recorded in the recording medium is formed so that the stereo image P enters the stereo frame 50 while climbing up or rotating, the stereo image P can be made to look more stereoscopic so that pleasure and impression can be given to the viewer.

As described above, in accordance with the invention, a stereo image can be displayed with a simple configuration while pleasure and impression can be given to a viewer.

What is claimed is:

1. An image display device, comprising:
   a display portion having an image display surface for displaying an image inclusive of a stereo image;
   an image transmission panel disposed so as to be separated from and parallel to the image display surface and for forming the image displayed on the image display surface, in a space on a side opposite to the display portion;
   a stereo frame disposed that a part of an image-forming plane where the image is formed is located within the stereo frame; and
   a video signal supply portion for supplying a video signal to the display portion so that the stereo image formed on the image-forming plane moves between an inside space of the stereo frame and an outside space of the stereo frame.

2. The image display device according to claim 1, wherein the stereo image has a size enough to be contained in the inside space of the stereo frame.

3. The image display device according to claim 1, wherein the stereo frame is made of a transparent material and shaped like a cylinder.

4. The image display device according to claim 1, wherein
   the image transmission panel includes a pair of micro lens arrays each having opposite surfaces on each of which a plurality of convex lenses are arranged in the form of a matrix so as to be adjacent to one another; and
   the pair of micro lens arrays are arranged so that optical axes of corresponding ones of the convex lenses are coaxial with each other.

5. The image display device according to claim 1,
   wherein the video signal supply portion supplies a video signal to the display portion so that the image except the stereo image exhibits a dark color.

6. An information recording medium in an image display device, wherein the image display device includes a display portion having an image display surface for displaying an image inclusive of a stereo image, an image transmission panel disposed so as to be separated from and parallel to the image display surface and for forming the image displayed on the image display surface, in a space on a side opposite to the display portion, a stereo frame disposed such that a part of an image-forming plane where the image is formed, and a video signal supply portion for playing back the information recording medium and supplying a playback video signal to the display portion; and
   wherein the information recording medium records thereon the video signal so that the stereo image formed on the image-forming plane moves between an inside space of the stereo frame and an outside space of the stereo frame.

7. The information recording medium according to claim 6,
   wherein the video signal is reproduced by the image display device so that the stereo image has a size enough to be contained in the inside space of the stereo image.

8. The information recording medium according to claim 6,
   wherein the video signal is reproduced by the image display device so that the image except the stereo image exhibits a dark color.

9. An image reproducing method, comprising:
   disposing a stereo frame on a part of an image-forming plane, the image-forming plane being a focusing surface of an image transmission portion;
   reproducing a predetermined video signal to display an image on a display; and
   focusing the image on the image-forming plane through the image transmission portion to form a stereo image on the image-forming plane, wherein a part of the image-forming plane where the image is formed is located within the stereo frame;
   wherein
   the stereo image moves between an inside space of the stereo frame and an outside space of the stereo frame.

* * * * *